(12) United States Patent
Sekigawa et al.

(10) Patent No.: US 12,063,334 B2
(45) Date of Patent: *Aug. 13, 2024

(54) IMAGE READING APPARATUS AND IMAGE FORMING SYSTEM

(71) Applicant: CANON KABUSHIKI KAISHA, Tokyo (JP)

(72) Inventors: Akito Sekigawa, Chiba (JP); Naoto Tokuma, Chiba (JP); Eikou Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,271

(22) Filed: Feb. 10, 2023

(65) Prior Publication Data

US 2024/0064252 A1    Feb. 22, 2024

Related U.S. Application Data

(62) Division of application No. 17/326,660, filed on May 21, 2021, now Pat. No. 11,606,473.

(30) Foreign Application Priority Data

May 29, 2020 (JP) ................................ 2020-095100

(51) Int. Cl.
*H04N 1/04* (2006.01)
*H04N 1/00* (2006.01)
*H04N 1/028* (2006.01)
*H04N 1/047* (2006.01)
*H04N 1/12* (2006.01)

(52) U.S. Cl.
CPC ....... *H04N 1/1215* (2013.01); *H04N 1/00795* (2013.01); *H04N 1/028* (2013.01); *H04N 1/047* (2013.01)

(58) Field of Classification Search
USPC ................................ 358/1.5, 3.26, 498, 496
See application file for complete search history.

(56) References Cited

U.S. PATENT DOCUMENTS

| 4,990,764 A | 2/1991 | Yokochi |
|---|---|---|
| 5,055,946 A | 10/1991 | Kurahashi |
| 5,225,917 A | 7/1993 | Osako |

(Continued)

FOREIGN PATENT DOCUMENTS

| JP | S63-108257 U | 7/1988 |
|---|---|---|
| JP | H01-110554 U | 7/1989 |

(Continued)

OTHER PUBLICATIONS

Mar. 12, 2024 Japanese Official Action in Japanese Patent Appln. No. 2020-095100.

*Primary Examiner* — Cheukfan Lee
(74) *Attorney, Agent, or Firm* — Venable LLP

(57) ABSTRACT

An image reading apparatus includes an image reading sensor, a transparent plate, a guiding member, a first roller pair, and a second roller pair provided upstream of the first roller pair with respect to a sheet feeding direction. The first roller pair and the second roller pair are disposed so as to nip a sheet in each of nips of the first roller pair and the second roller pair when a leading end of the sheet enters between the guiding member and the transparent plate.

6 Claims, 11 Drawing Sheets

(56) References Cited

U.S. PATENT DOCUMENTS

| | | |
|---|---|---|
| 6,147,778 A | 11/2000 | Yamada |
| 6,217,143 B1 | 4/2001 | Munakata |
| 6,678,076 B1 | 1/2004 | Hasegawa |
| 7,703,764 B2 | 4/2010 | Kusama |
| 8,087,667 B2 | 1/2012 | Sekigawa |
| 8,240,664 B2 | 8/2012 | Sekigawa |
| 8,500,122 B2 | 8/2013 | Kushida |
| 8,550,461 B2 | 10/2013 | Sekigawa |
| 8,613,442 B2 | 12/2013 | Gamo |
| 8,752,837 B2 | 6/2014 | Iwata |
| 8,794,617 B2 | 8/2014 | Tokuma |
| 8,851,468 B2 | 10/2014 | Tokuma |
| 8,867,094 B2 | 10/2014 | Fujise |
| 9,033,330 B2 | 5/2015 | Tokuma |
| 9,067,753 B2 | 6/2015 | Tokuma |
| 9,102,497 B2 | 8/2015 | Tokuma |
| 9,509,875 B2 | 11/2016 | Saito |
| 9,665,055 B2 | 5/2017 | Sekigawa |
| 9,738,469 B2 | 8/2017 | Sekigawa |
| 9,843,693 B2 | 12/2017 | Ooishi |
| 9,890,011 B2 | 2/2018 | Tokuma |
| 9,914,611 B2 | 3/2018 | Tokuma |
| 9,932,194 B2 | 4/2018 | Tokuma |
| 9,932,195 B2 | 4/2018 | Sekigawa |
| 10,183,829 B2 | 1/2019 | Tokuma |
| 10,294,059 B2 | 5/2019 | Tokuma |
| 10,317,836 B2 | 6/2019 | Tokuma |
| 10,782,639 B2 | 9/2020 | Tokuma |
| 10,981,738 B2 | 4/2021 | Sekigawa |
| 11,606,473 B2 | 3/2023 | Sekigawa et al. |
| 2003/0222395 A1 | 12/2003 | Kitami |
| 2006/0227195 A1 | 10/2006 | Arai |
| 2008/0239416 A1 | 10/2008 | Kato |
| 2009/0322010 A1 | 12/2009 | Kusama |
| 2012/0275839 A1 | 11/2012 | Kushida |
| 2012/0288310 A1 | 11/2012 | Kamiya |
| 2014/0030000 A1 | 1/2014 | Gamo |
| 2015/0312425 A1 | 10/2015 | Saito |
| 2016/0057301 A1 | 2/2016 | Motoyama |
| 2016/0251182 A1 | 9/2016 | Kii |
| 2016/0286062 A1 | 9/2016 | Tomatsu |
| 2017/0223204 A1 | 8/2017 | Ooishi |
| 2019/0127167 A1 | 5/2019 | Mori |
| 2020/0041946 A1 | 2/2020 | Sekigawa |
| 2020/0150576 A1 | 5/2020 | Suwa |
| 2020/0247627 A1 | 8/2020 | Sekigawa |
| 2020/0387099 A1 | 12/2020 | Tokuma |
| 2021/0087004 A1 | 3/2021 | Koga |
| 2021/0314458 A1 | 10/2021 | Sekigawa |
| 2021/0362969 A1 | 11/2021 | Mori |
| 2021/0365752 A1 | 11/2021 | Mori |
| 2021/0377412 A1 | 12/2021 | Tokuma |
| 2024/0064252 A1 * | 2/2024 | Sekigawa ............ H04N 1/1215 |

FOREIGN PATENT DOCUMENTS

| | | |
|---|---|---|
| JP | H03-263967 A | 11/1991 |
| JP | H10-262136 A | 9/1998 |
| JP | 2010-006508 A | 1/2010 |
| JP | 2015-205773 A | 11/2015 |
| JP | 2017-139551 A | 8/2017 |

* cited by examiner

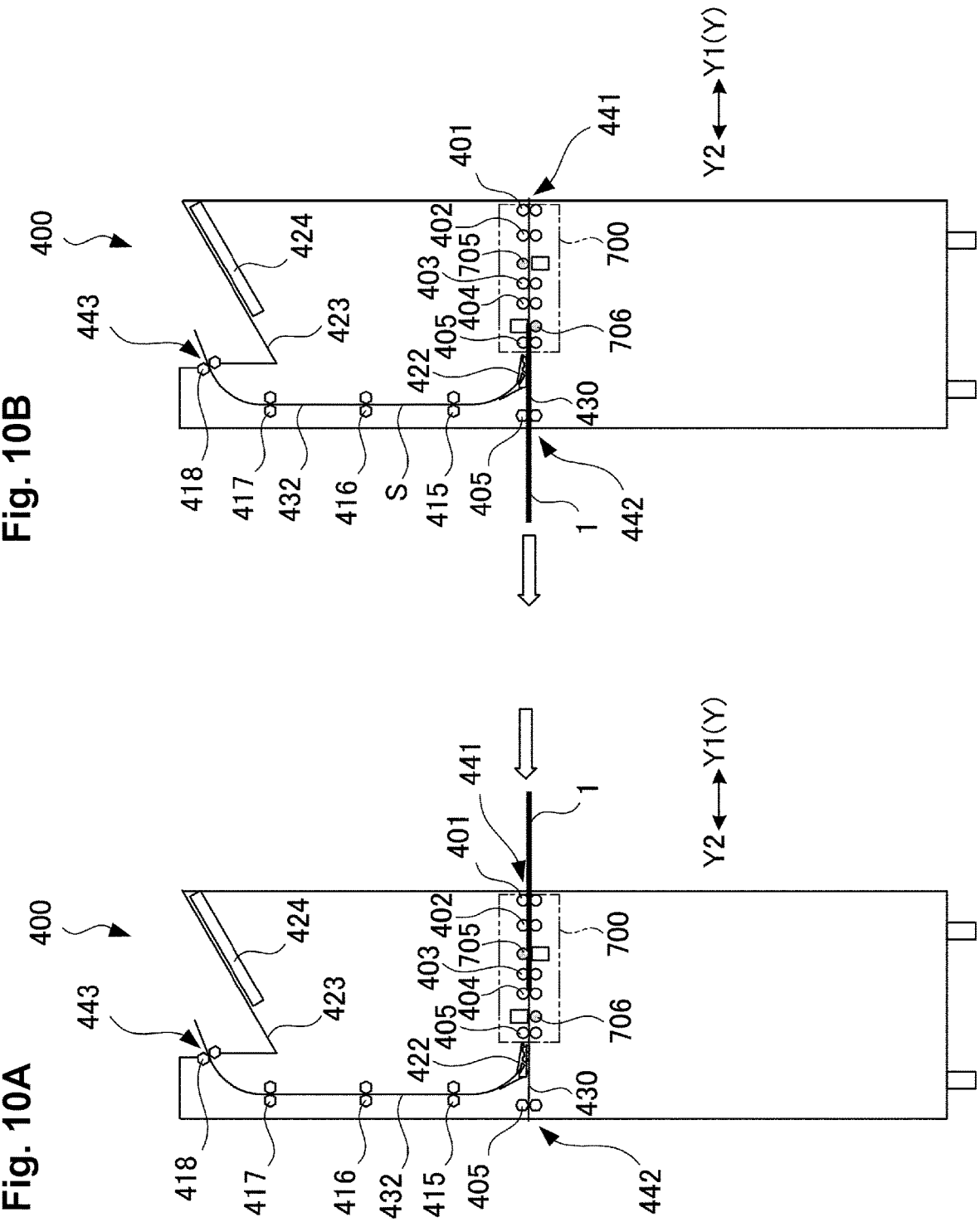

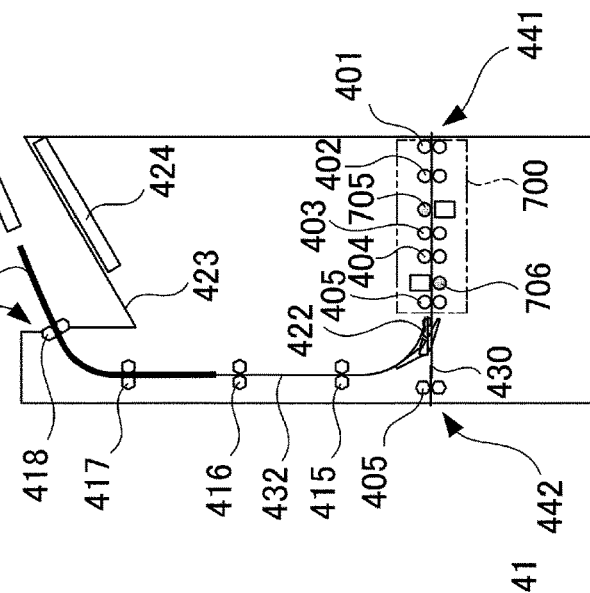
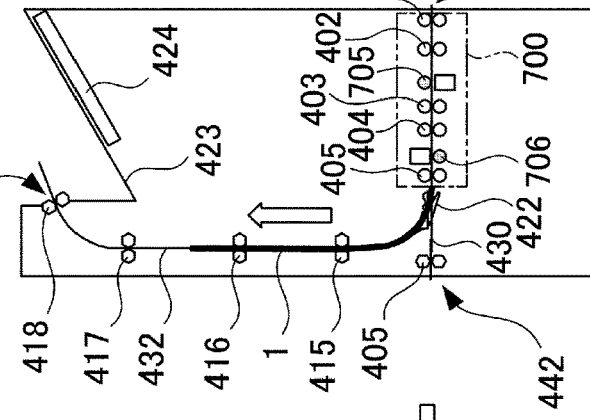
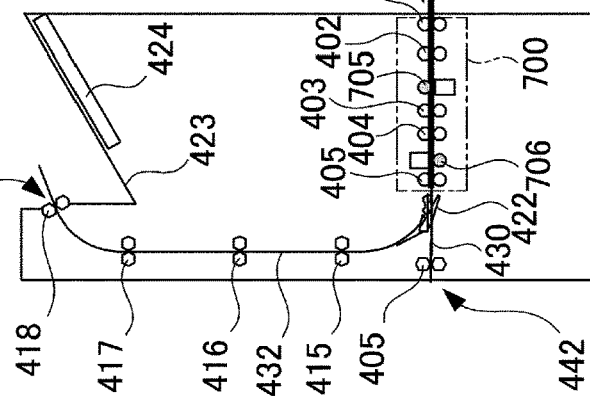

IMAGE READING APPARATUS AND IMAGE FORMING SYSTEM

This application is a divisional of application Ser. No. 17/326,660 filed May 21, 2021, U.S. Pat. No. 11,606,473 B2.

FIELD OF THE INVENTION AND RELATED ART

The present invention relates to an image reading apparatus for reading an image on a sheet and relates to an image forming system including the image reading apparatus.

Conventionally, an image forming system including an image forming apparatus for forming an image on a sheet and an image reading apparatus for reading the image, formed on the sheet by the image forming apparatus, by a line sensor has been disclosed (U.S. Patent Application Publication No. US2016/0286063). This image forming system reads an image including cross marks (register marks) as identification marks formed on front and back surfaces of the sheet by a reading apparatus while feeding the sheet and performs a correcting process of an image forming position in the image forming apparatus on the basis of a reading result.

In the image reading apparatus as described above, when a leading end portion of the sheet contacts a sheet guiding member or the like during reading of the leading end portion of the sheet and thus an external force is exerted on the sheet with respect to a direction opposite to a sheet feeding direction, a sheet feeding speed changes, so that it is difficult to obtain good reading accuracy.

SUMMARY OF THE INVENTION

A principal object of the present invention is to provide an image reading apparatus and an image forming system which are capable of improving reading accuracy of an image.

According to an aspect of the present invention, there is provided an image reading apparatus for reading image information of a sheet discharged from an image forming apparatus, the image reading apparatus comprising: an image reading sensor configured to read image information of a first surface of the sheet at a reading position; a transparent plate provided opposed to the image reading sensor and having a light-transmission property; a guiding member provided opposed to the image reading sensor in a state in which a gap is formed between itself and the transparent plate on a side opposite from the image reading sensor with respect to the transparent plate; a first roller pair provided upstream of the transparent plate with respect to a sheet feeding direction and configured to feed the sheet toward the reading position; and a second roller pair provided upstream of the first roller pair with respect to the sheet feeding direction and configured to feed the sheet toward the reading position, wherein the first roller pair and the second roller pair are disposed so as to nip the sheet in each of nips of the first roller pair and the second roller pair when a leading end of the sheet enters between the guiding member and the transparent plate.

Further features of the present invention will become apparent from the following description of exemplary embodiments with reference to the attached drawings.

BRIEF DESCRIPTION OF THE DRAWINGS

FIGS. 10A and 10B are schematic views for illustrating a sheet feeding operation in a normal job, in which different states are shown, respectively.

FIGS. 11A through 11C are schematic views for illustrating a sheet feeding operation in a front and back registration job, in which different states are shown, respectively.

DESCRIPTION OF THE EMBODIMENTS

In the following, an image reading apparatus and an image forming apparatus according to embodiments will be described while making reference to the drawings. As regards dimensions, materials, shapes and relative arrangement of constituent elements described in the following embodiments, an applied range of the present invention is not intended to be limited thereto unless otherwise specified.

[General Structure of Image Forming System]

Figure 1:
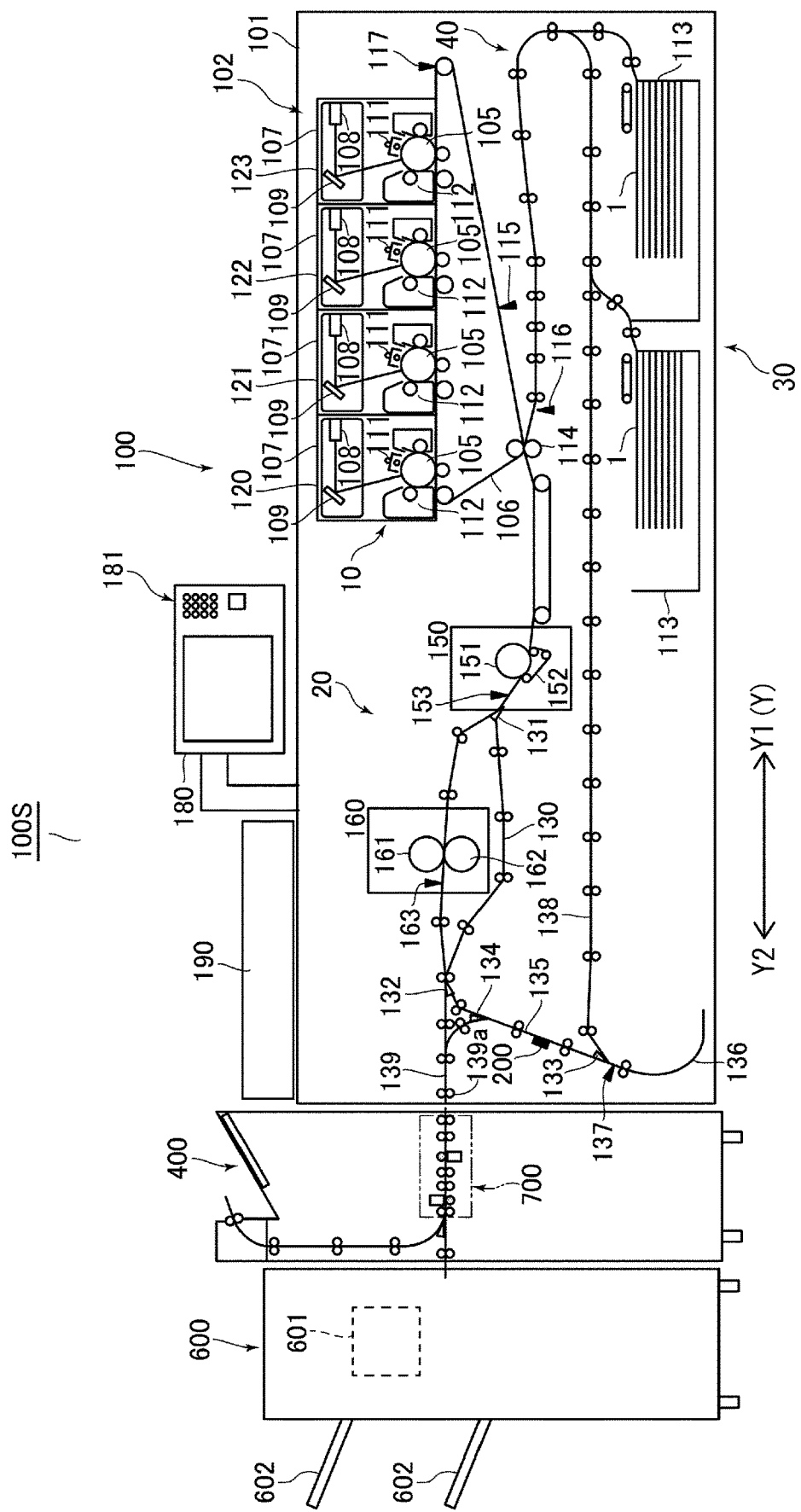
FIG. 1 is a schematic view of an image forming system according to an embodiment of the present invention.

FIG. 1 is a schematic view showing an image forming system 100S according to an embodiment of the present invention. The image forming system 100S includes an image forming apparatus 100, an adjusting unit 400 and a finisher 600. In this embodiment, as the image forming apparatus, the image forming apparatus 100 which is a laser beam printer of an electrophotographic type will be described as an example, but the image forming apparatus is not limited thereto and may also be a printer of an ink jet type or a printer of a sublimation type. Further, the adjusting unit 400 is the image reading apparatus in this embodiment.

In a casing 101 of the image forming apparatus 100, an image forming engine 102 and a control board accommodating portion (not shown) for accommodating a printer controller 103 (FIG. 2) for controlling an operation of the image forming system 100S. The image forming engine 102 as an image forming portion includes an optical processing mechanism 10 for forming an image on a recording material by an image forming process, a fixing processing mechanism 20, and a feeding processing mechanism 30 and a conveying processing mechanism 40 which are used for feeding and conveying a rectangular sheet 1 used as the recording material, respectively. As the recording material, it is possible to use sheets including papers such as plain paper and thick paper, surface-treated papers such as coated paper and embossed paper, a plastic film, a cloth, and the like.

The optical processing mechanism 10 includes stations 120, 121, 122 and 123 for forming toner images of colors of yellow, magenta, cyan and black and includes an intermediary transfer belt 106. In each of the stations 120 to 123, a surface of a photosensitive drum 105 which is a drum-shaped photosensitive member is electrically charged by a primary charger 111. A laser scanner portion 107 performs an exposure process of the photosensitive drum 105 on the basis of an instruction signal which is formed on the basis of the image data and which is sent to the laser scanner portion 107. The laser scanner portion 107 includes a laser driver for turning on and off an unshown semiconductor laser to emit laser light. The laser scanner portion 107 guides the laser light from the semiconductor laser to the photosensitive drum 105 through a reflection mirror 109 while dividing the laser light into portions by a rotatable polygonal mirror with respect to a main scan direction (widthwise direction of the sheet). By this, on the surface of the photosensitive drum 105, an electrostatic latent image corresponding to the image data is formed. Incidentally, in this embodiment, the main scan direction is a substantially horizontal direction (rear direction of FIG. 1).

A developing device 112 accommodates therein a developer containing toner and supplies charged toner particles to the photosensitive drum 105. The toner particles are deposited on the drum surface depending on a surface potential distribution, so that the electrostatic latent image carried on the photosensitive drum 105 is visualized as a toner image. The toner image carried on the photosensitive drum 105 is transferred (primary-transferred) onto the intermediary transfer belt 106 to which a voltage of a polarity opposite to a normal charge polarity of the toner is applied. In the case where a color image is formed, toner images formed by the four stations 120 to 123 are multiple-transferred onto the intermediary transfer belt 106 so as to be superposed on each other, so that a full-color toner image is formed on the intermediary transfer belt 106.

On the other hand, the feeding processing mechanism 30 feeds sheets 1 one by one toward a transfer roller 114 from a sheet accommodating portion 113 inserted into the casing 101 of the image forming apparatus 100 so as to be capable of being pulled out. The toner image carried on the intermediary transfer belt 106 which is an intermediary transfer member is transferred (secondary-transferred) onto the sheet 1 by the transfer roller 114.

Around the intermediary transfer belt 106, an image formation start position detecting sensor 115 for determining a print start position when the image formation is carried out, a feeding timing sensor 116 for timing feeding of the sheet 1, and a density sensor 117 are provided. The density sensor 117 measures a density of a patch image for a test carried on the intermediary transfer belt 106. The printer controller 103 adjusts an operation condition (for example, setting of a target charging potential of the primary charger 111 and a bias voltage of the developing provided 112) of the optical processing mechanism 10 on the basis of a detection result of the density sensor 117.

The fixing processing mechanism 20 in this embodiment is constituted by a first fixing device 150 and a second fixing device 160. The first fixing device 150 includes a fixing roller 151 for applying heat to the sheet 1, a pressing belt 152 for causing the sheet 1 to press-contact the fixing roller 151, and a first post-fixing sensor 153 for detecting completion of a fixing process by the first fixing device 150. The fixing roller 151 is a hollow roller and includes therein a heater. The first fixing device 150 applies heat and pressure to the toner image on the sheet 1 while nipping and feeding the sheet 1 by the fixing roller 151 and the pressing belt 152 which constitute a rotatable member pair. By this, the toner particles are melted and then is stuck, so that an image is fixed on the sheet 1. The second fixing device 160 is disposed downstream of the first fixing device 150 in a feeding passage of the sheet 1. The second fixing device 160 has a function of enhancing glossiness of the image fixed on the sheet 1 by the first fixing device 150 and of ensuring a fixing property of the image on the sheet 1. Similarly as the first fixing device 150, the second fixing device 160 includes a fixing roller 161 and a pressing roller 162 as a rotatable member pair for heating and pressing the image on the sheet 1 while feeding the sheet 1, and a second post-fixing sensor 163 for detecting completion of a fixing process by the second fixing device 160.

Incidentally, depending on a kind of the sheet 1, there is no need to pass the sheet 1 through the second fixing device 160 in some instances. In such a case, the image forming apparatus 100 includes a circumventing feeding passage 130 for discharging the sheet 1 without via the second fixing device 160 for the purpose of reducing energy consumption. The sheet 1 sent from the first fixing device 150 is derived to either one of the second fixing device 160 and the circumventing feeding passage 130 by a first switching flapper 131.

The sheet 1 passed through the second fixing device 160 or the circumventing feeding passage 130 is derived to either one of discharge feeding passage 139 and a reverse feeding passage 135 by a second switching flapper 132. The sheet 1 fed to the reverse feeding passage 135 is then subjected to detection of a position thereof by a reverse sensor 137, so that a downstream end (leading end) and an upstream end (trailing end) of the sheet 1 with respect to a sub-scan direction (sheet feeding direction) are changed to each other by a switch-back operation performed by reversing portion 136. In the case of double-side printing the sheet 1 on which the image is formed on a front surface (second surface) thereof is fed toward the transfer roller 114 again via a re-feeding passage 138 in a state in which the reading end and the trailing end of the sheet 1 are changed to each other by the reversing portion 136, and then an image is formed on a back surface (first surface) of the sheet 1 opposite from the front surface of the sheet 1.

The sheet 1 on which image formation of one-side printing is ended or the sheet 1 on which image formation on the back surface of the sheet 1 in the double-side printing is discharged to an outside of the image forming apparatus 100 by a discharging roller 139a (discharging portion) provided in the discharge feeding passage 139. Incidentally, between the reverse feeding passage 135 and the discharge feeding passage 139, a switching flapper 134 capable of guiding the sheet 1, switched back by the reversing portion 136, toward the discharge feeding passage 139 is provided and is constituted so that the front surface and the back surface of the sheet 1 when the sheet 1 is discharged from the image forming apparatus 100 are selectable. Incidentally, at an upper portion of the image forming apparatus 100, an image reading apparatus 190 for reading image information from an original is provided.

Figure 2:
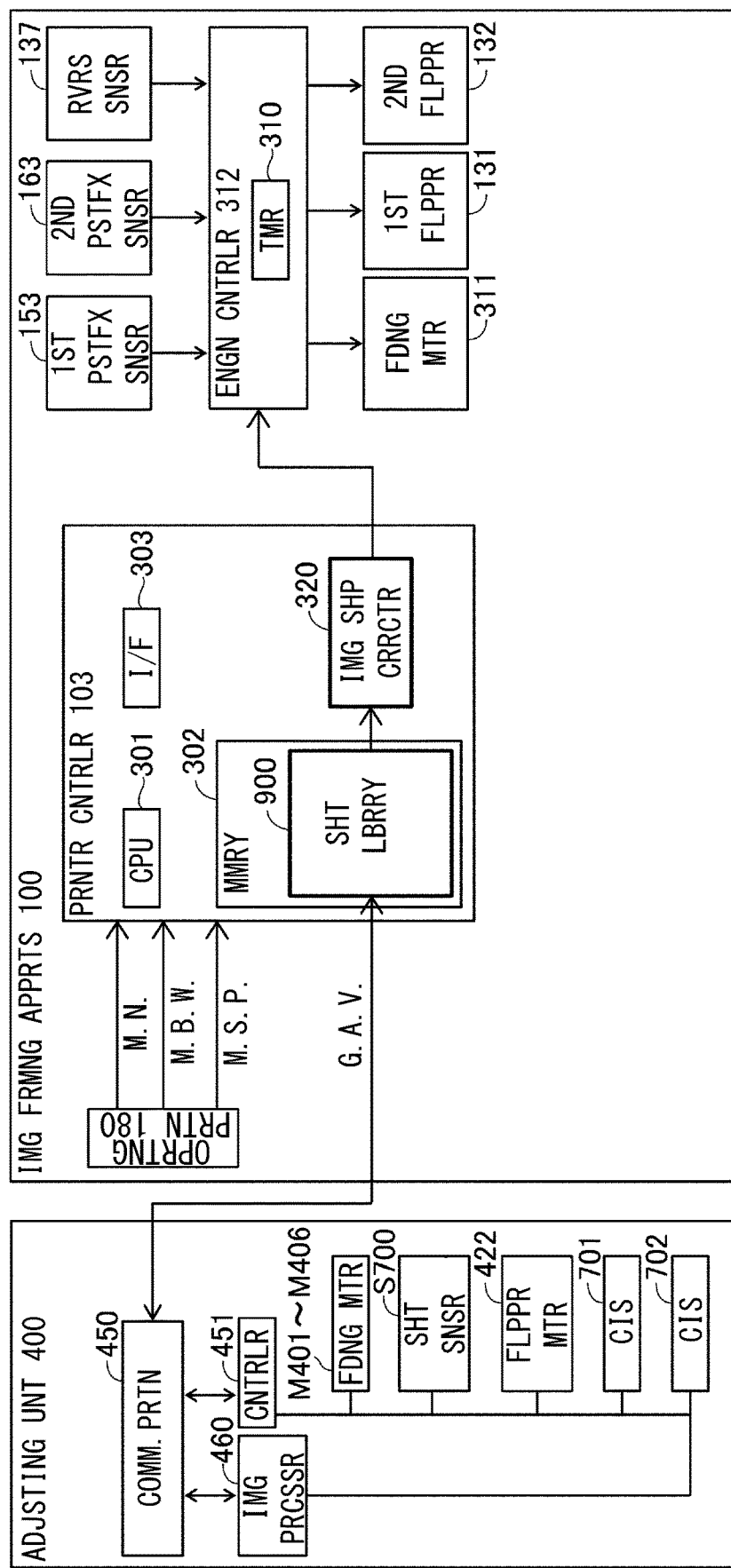
FIG. 2 is a block diagram showing a control constitution of the image forming system.

As shown in FIG. 2, the image forming apparatus 100 includes the printer controller 103 as a control means for carrying out integrated control of the operation of the image forming system 100S (FIG. 1) and an engine controller 312 for controlling the image forming engine 102 (FIG. 1). The printer controller 103 is a control board on which at least one processor (hereinafter referred to as CPU) 301, a memory 302 and an external interface (I/F) 303 are mounted. The memory 302 contains a transient storing medium and a non-transient storing medium, and is not only a storage place of a program and data but also an operating space when the CPU 301 executes the program.

The engine controller 312 causes the image forming engine 102 to perform the above-described image forming process on the basis of an instruction signal or the like from the printer controller 103, so that the image is formed on the sheet 1. For example, the engine controller 312 controls operations of a feeding motor 311 for driving the rollers for feeding the sheet 1 and the first switching flapper 131 and the second switching flapper 132 on the basis of detection signals of the first post-fixing sensor 153, the second post-fixing sensor 163 and the reverse sensor 137.

The image forming apparatus 100 is provided with an operating portion 180 (FIG. 1) which is a user interface of the image forming system 100S. The operating portion 180 includes a display as a display means for displaying information to the user. Further, the operating portion 180 is provided with, for example, physical keys such as numeric keys and a print execution button and the like, and a touch panel function of the display as an input means capable of inputting instructions and data from the user to the image forming system 100S. By the operation of the operating portion 180, the user is capable of inputting pieces of information indicating sheet attributes such as a name, a basis weight and the presence or absence of surface treatment of the sheet 1 set in a certain sheet accommodating portion 113 (FIG. 1), to the printer controller 103. The inputted attributes are registered in a sheet library 900 stored in the memory 302.

The printer controller 103 is connected to an external wired or wireless communication network via the external interface (I/F) 303 and is communicatable between itself and an external computer (not shown). Further, the printer controller 103 is also connected to control circuits of devices (the adjusting unit 400 and the finisher 600 in this embodiment) which are connected to the image forming apparatus 100 and which constitute the image forming system 100S. The printer controller 103 carries out communication with these devices and causes the image forming apparatus 100 and the other devices to be cooperated with each other.

[General Structure of Adjusting Unit]

Next, a general structure of the adjusting unit 400 which is the image reading apparatus shown in FIG. 1 and which reads image information of the sheet discharged from the image forming apparatus 100 will be described. In general, the image forming apparatus 100 of a print type, such as an electrophotographic type or an ink jet type, in which the image is formed on a cut sheet carries out the image formation on a one-edge basis of a rectangular sheet. For this reason, positional accuracy between a contour (outer edge) of the sheet and an image formed on the sheet and a relative positional accuracy between the image on the front surface of the sheet and the image on the back surface of the sheet, i.e., so-called front and back registration accuracy is largely influenced by cut accuracy (length, width, perpendicularity and parallelism) of the sheet in general.

The image forming system S in this embodiment perform adjustment of a relative position between the image on the front surface of the sheet and the image on the front surface of the sheet and the image on the back surface of the sheet (i.e., front and back registration) by adjusting the position of the image relative to a contour of the sheet and magnification of the image or the like. Specifically, when the image forming system 100S performs the front and back registration, first, by the image forming apparatus 100, a test pattern 820 (FIGS. 8A and 8B) is formed on the front surface and the back surface of the sheet. For example, the test pattern 820 includes a plurality of rectangular images (patch images) formed in the neighborhood of an outer edge of the sheet.

Thereafter, the adjusting unit 400 reads the test pattern (image information) 820 of the sheet and the contour of the sheet, and then sends (feeds back) information, based on a read result, to the image forming apparatus 100. The image forming apparatus 100 performs the front and back registration on the basis of the information received from the adjusting unit 400. By performing such front and back registration, the image forming system 100S of this embodiment is capable of improving the front and back registration accuracy even when there is a variation in cutting of the sheet.

In such an image forming system 100S of this embodiment, the adjusting unit 400 is provided between the image forming apparatus 100 and the finisher 600 with respect to a horizontal direction (left-right direction, Y-direction). That is, an upstream device of the adjusting unit 400 in this embodiment is the image forming apparatus 100, and a downstream device of the adjusting unit 400 is the finisher 600. The finisher 600 includes a processing portion 601 for subjecting the sheet to a marginal cutting process, a binding process, a saddle process and the like process, and discharges the processed sheet or sheet bundle (or the sheet received form the upstream device in the case where there is no need to perform the processes) as a product of the image forming system 100S.

Incidentally, the upstream device and the downstream device of the adjusting unit 400 change depending on a constitution of the image forming system 100S. For example, the adjusting unit 400 is not always directly connected to the image forming apparatus 100, but a constitution in which an intermediary unit is provided between the image forming apparatus 100 and the adjusting unit 400 and in which the adjusting unit 400 receives the sheet from the intermediary unit may also be employed. As an example of the intermediary unit, it is possible to cite a device for performing coating such that transparent toner is deposited on an image surface of the image-formed sheet and thus glossiness is imparted to the image, a cooling device for cooling the sheet, and the like device. Further, in some cases, a sheet processing device other than the finisher 600 is connected to the adjusting unit 400 on a side downstream of the adjusting unit 400. As an example of such a sheet processing device, it is possible to cite an inserter for inserting a sheet as a cover into the sheet bundle and a stacker movable by a hard cart in a state in which a large volume of products are accommodated.

Figure 3:
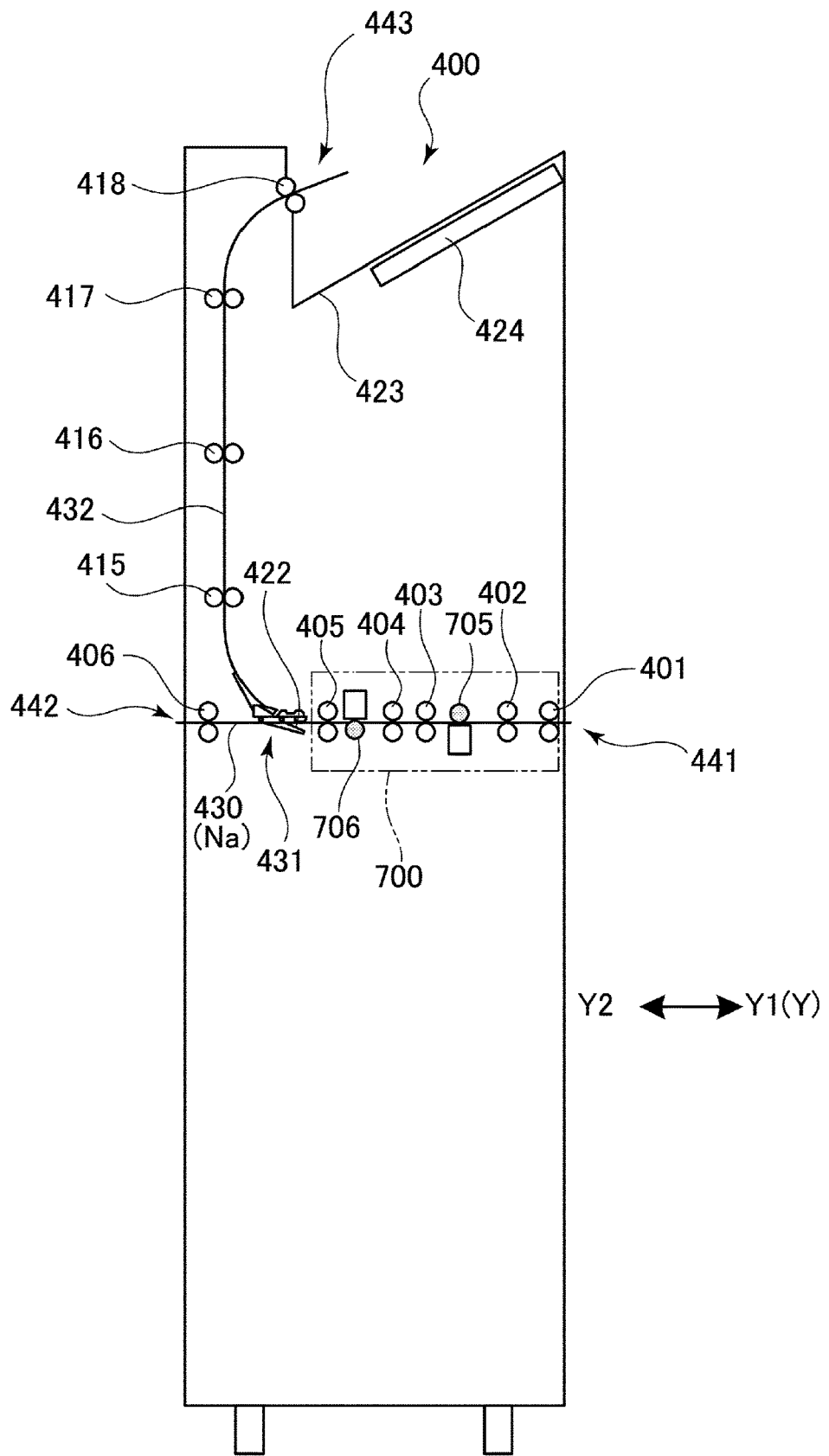
FIG. 3 is a schematic view of an adjusting unit.

As shown in FIG. 3, the adjusting unit 400 is provided with a receiving opening 441 for permitting reception of the sheet, discharged from the image forming apparatus 100, into the adjusting unit 400 and a first discharging opening 442 for permitting discharge of the sheet toward the finisher 600 (FIG. 1). Further, the adjusting unit 400 includes a through passage 430 formed so as to linearly connect the receiving opening 441 and the first discharging opening 442 along the substantially horizontal direction (Y-direction), and includes a discharging passage 432 branching upward from an intermediary portion of the through passage 430 and formed upward. Further, the adjusting unit 400 is provided with a second discharging opening 443 permitting discharge of the sheet, received through the receiving opening 441. to the outside of the adjusting unit 400 through the discharging passage 432, and a discharge tray 423 which is provided atom upper portion of the adjusting unit 400 and on which sheets discharged through the second discharging opening 443 are stacked. The through passage 430 is a first sheet feeding passage in this embodiment, the discharging passage 432 is a second in this embodiment, and the discharge tray 423 is a sheet stacking means in this embodiment.

Along the through passage 430, a front and rear registering portion 700 for reading the sheet while feeding the sheet received through the receiving opening 441, and an outlet feeding roller pair 406 for feeding the sheet toward the finisher 600 through the first discharging opening 442 are provided. The front and rear registering portion 700 is provided with a plurality of roller pairs along the through passage 430 and feeds the sheet toward the outlet feeding roller pair 406 in a feeding direction (sheet feeding direction) Y2 while nipping the sheet by the plurality of roller pairs. Incidentally, the feeding direction Y2 is the sub-scan direction of the sheet, on the through passage 430, fed toward a left side of FIG. 3 along the through passage 430 and is perpendicular to the main scan direction.

The outlet feeding roller pair 406 is disposed opposed to each other and is constituted by a pair of rollers (rotatable members) rotated by a feeding motor M406 (FIG. 2). The outlet feeding roller pair 406 feeds and discharges, toward the finisher 600 along the through passage 430 through the first discharging opening 442, the sheet subjected to reading by the front and back registering portion 700 while nipping the sheet.

A branch portion 431 from the through passage 430 toward the discharging passage 432 is provided with a switching flapper 422 which is a guiding member capable of switching the sheet feeding passage between a downstream portion of the through passage 430 and the discharging passage 432. Further, the adjusting unit 400 is provided along the discharging passage 432 with feeding roller pairs 415, 416, 417 and 418 for feeding the sheet which are provided at a plurality of positions. These feeding roller pairs 415 and 418 feed the sheet toward the second discharging opening 443 along the discharging passage 432 and discharges the sheet onto the discharge tray 423 through the second discharging opening 443.

Figure 4:
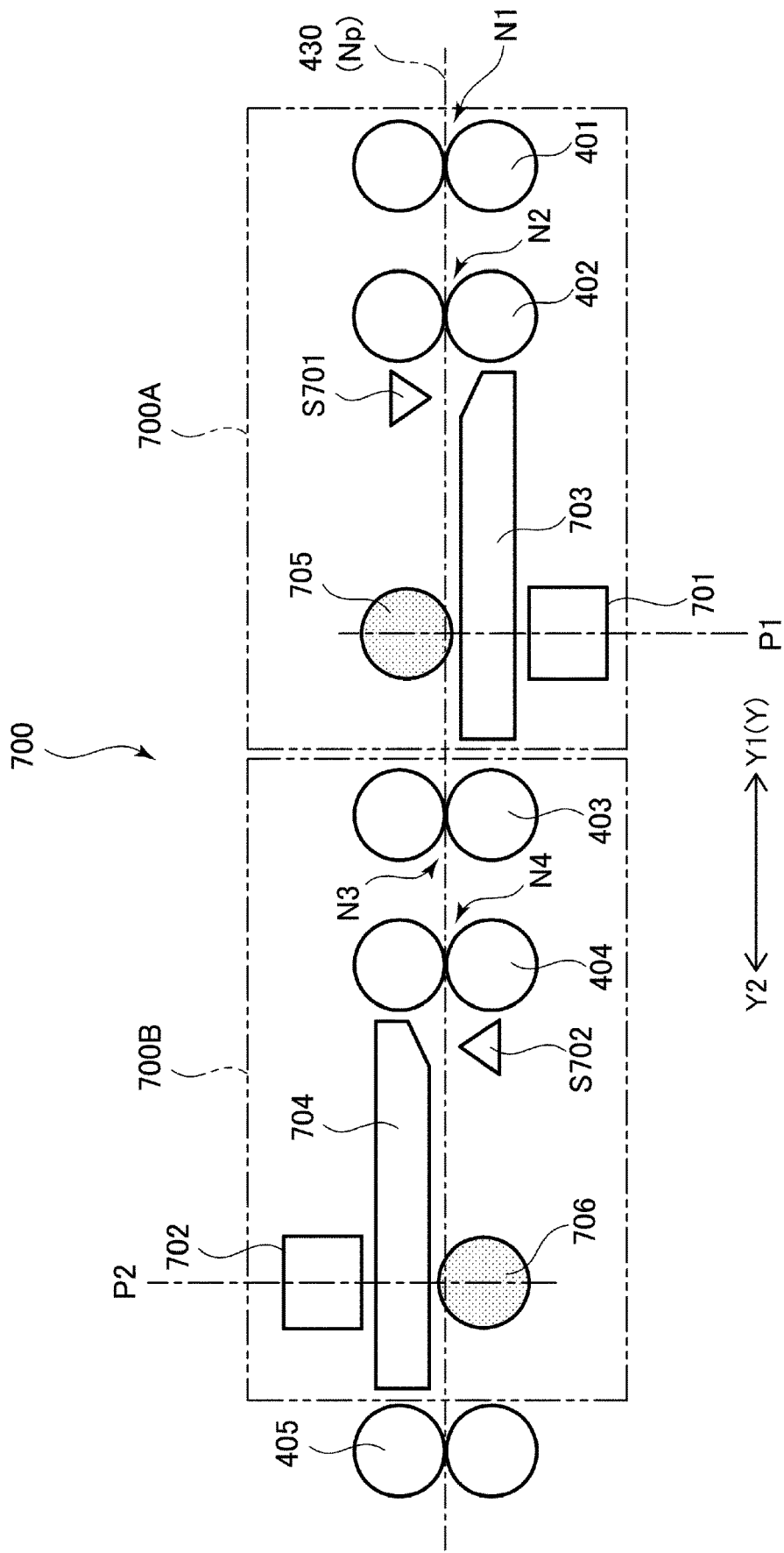
FIG. 4 is a side view of a front and back registering portion.

As shown in FIG. 4, the front and back registering portion 700 includes a first reading portion 700A for reading a contour of the sheet and image information of a lower surface of the sheet and a second reading portion, 700B provided downstream of the first reading portion 700A with respect to the feeding direction Y2, for reading the contour of the sheet and image information of an upper surface of the sheet. Incidentally, the order of reading of the image information of the sheet is not limited thereto, but the reading portion for reading the image information of the lower surface may also be disposed downstream of the reading portion for reading the image information of the upper surface.

The first reading portion 700A includes a first feeding roller pair 401 as a second rotatable member pair provided so as to face the receiving opening 441 (FIG. 3) and a second feeding roller pair 402 as a first rotatable member pair provided downstream of and adjacent to the first feeding roller pair with respect to the feeding direction Y2. Further, the first reading portion 700A includes a back surface CIS 701 as a first reading means provided downstream of the second feeding roller pair 402 with respect to the feeding direction Y2, a guiding roller 705 as a first guiding member, and a transparent guide 703 as a first light-transmissive plate.

The first feeding roller pair 401 comprises a pair of rollers (rotatable members) which are rotatable about rotational axes (not shown) extending along the main scan direction (widthwise direction of the sheet, X-direction shown in FIG. 6) and which are provided opposed to each other, so that the pair of rollers forms a first nip N1 in which the sheet can be nipped. The first feeding roller pair 401 is driven by a feeding motor M401 (FIG. 6) as a motor and feeds the sheet, received through the receiving opening 441, in the feeding direction Y2 toward an inside of the adjusting unit 400 while nipping the sheet in the first nip N1.

The second feeding roller pair 402 comprises a pair of rollers (rotatable members) which are rotatable about rotational axes (not shown) extending along the main scan direction and which are provided opposed to each other, so that the pair of rollers forms a second nip N2 in which the sheet can b e nipped. The second feeding roller pair 402 is driven by a feeding motor M402 (FIG. 6) as a motor and feeds the sheet, fed by the first feeding roller pair 401, in the feeding direction Y2 while nipping the sheet in the second nip N2. Incidentally, each of the first feeding roller pair 401 and the second feeding roller pair 402 may be constituted by a pair of rollers and may also be constituted by a plurality of roller pairs (rotatable member pairs) provided with gaps the between with respect to the main scan direction.

The back surface CIS 701 is a contact image sensor disposed on a lower surface (back surface, first surface) side of the sheet fed along the through passage 430. Specifically, the back surface CIS 701 includes an LED array 7a as a light source, a sensor array 7b comprising an image pick-up element such as CMOS, and a lens array 7c for forming an image of reflected light, from the fed sheet, on the sensor array 7b. The lens array 7c comprises a plurality of lenses which are of a refractive index distribution type and which constitute the 1:1 optical system. The LED array 7a, the sensor array 7b and the lens array 7c are arranged along the main scan direction over an entire range in which the back surface CIS 701 is capable of reading the sheet with respect to the main scan direction.

The back surface CIS 701 which is thus constituted reads the contour and image information of the sheet, fed along the through passage 430, from the lower surface of the sheet at a first reading position P1. Incidentally, the first reading position P1 is specifically an optical axis position of the lens array 7c for guiding reflected light of the LED array 7a from the lower surface of the sheet to the sensor array 7b of the back surface CIS 701.

In general, in order to realize front and rear registration with high accuracy, there is a need that reading of a plurality of sheets is carried out and then the front and rear registration is performed on the basis of an averaged result. In this embodiment, it becomes possible to carry out the reading of the sheet while feeding the sheet without moving the sensor with use of the contact image sensor, so that it is possible to shorten a time required for the reading of the sheet even in the case where the reading of the plurality of sheets is carried out. Further, by using the image sensor of the 1:1 optical system, it is possible to downsize the apparatus compared with a sensor of a reduction optical system (CCD or the like).

The guiding roller 705 is a rotatable member provided above the through passage 430 and rotatably supported about a rotational axis (not shown) disposed along the main scan direction, and guides the sheet in contact with an upper surface of the sheet fed along the through passage 430. This guiding roller 705 is disposed opposed to the back surface CIS 701 while sandwiching the transparent guide 703 therebetween. In other words, the guiding roller 705 is disposed on a side opposite to the back surface CIS 701 while sandwiching the transparent guide 703 therebetween. Further, in other words, as shown in FIG. 4, as seen in a direction (up-down direction) perpendicular to the surface of the sheet fed along the through passage 430, the guiding roller 705 is disposed so as to overlap with the first reading position P1 and the feeding direction Y2. Further, this guiding roller 705 is disposed opposed to the back surface CIS 701, and therefore, constitutes a background when the back surface CIS 701 reads the contour of the sheet. For this reason, the guiding roller 705 is formed along the main scan direction over an entire range, in which the back surface CIS 701 is capable of reading the sheet with respect to the main scan direction, by a rubber or the like of a color low in brightness, such as black or gray, so as to clarify a contrast with the sheet.

Further, this guiding roller 705 is disposed so that a part thereof projects toward the back surface CIS 701 side (lower side, reading means side) than a nip line Np (common tangential line) in the second nip N2 of a pair of rollers constituting the second feeding roller pair 402. By this, the sheet passing through the first reading position P1 is easily fed while contacting the guiding roller 705, and a position of the sheet at the first reading position P1 with respect to a thickness direction, i.e., a position of the sheet with respect to a direction of depth of focus of the back surface CIS 701 is stabilized, so that reading accuracy can be improved. Incidentally, in order to reduce friction resistance to the sheet, the guiding roller 705 may also be constituted so as to be driven by an unshown driving means (motor).

The transparent guide 703 which is a transparent plate is formed in a flat plate shape along the main scan direction and the sub-scan direction by a light-transmissive material, for example, transparent glass or the like, and permits transmission of light emitted from the back surface CIS 701 or reflected light from the lower surface of the sheet. The transparent guide 703 is disposed below the through passage 430 between the back surface CIS 701 and the guiding roller 705. Further, an upstream end of the guiding roller 705 is positioned downstream of the second feeding roller pair 402 and upstream of the guiding roller 705 with respect to the feeding direction Y2. By employing such a constitution, the transparent guide 703 guides the sheet in contact with the lower surface of the sheet fed along the through passage 430.

The transparent guide 703 is disposed with a gap from the guiding roller 705, through which the sheet to be fed is capable of passing. For example, the transparent guide 703 and the guiding roller 705 are disposed close to each other so that a distance Lg (FIG. 5) therebetween is not less than a thickness of a maximum thickness sheet capable of being fed by the image forming apparatus 100 (adjusting unit 400) and not more than three times the thickness of the maximum thickness sheet. For example, in the case where the thickness of the maximum thickness sheet is 0.35 mm, the distance Lg is 0.35 mm or more and 1.05 mm or less. For that reason, the sheet fed along the through passage 430 is not nipped at the first reading position P1 between the transparent guide 703 and the guiding roller 705, so that the position of the sheet with respect to the thickness direction is restricted. By this, generation of abrasion powder due to friction between the sheet and the transparent guide 703 when the sheet is fed is suppressed, so that protection of the sheet and reading accuracy are realized. The sheet fed along the through passage 430 is subjected to reading of the back surface thereof by the back surface CIS 701 while being fed in a state in which the position of the sheet with respect to the thickness direction is restricted.

Incidentally, the front and rear registering portion 700 may also be constituted so that the distance Lg is capable of being adjusted in a range is not less than the thickness of the maximum thickness sheet capable of being fed by the image forming apparatus 100 (adjusting unit 400) and not more than three times the thickness of the maximum thickness sheet. Further, the transparent guide 703 is not limited to one provided separately from the back surface CIS 701, but for example, the transparent guide 703 may also be formed, as a part of a casing for accommodating a sensor array, integrally with a casing of the back surface CIS 701.

Further, the first reading portion 700A is provided between the second feeding roller pair 402 and the back surface CIS 701 and includes a sheet detecting sensor S701 for detecting a leading end of the sheet fed along the through passage 430. When the leading end of the sheet reaches a position of an optical axis of the sheet detecting sensor S701, a detection signal is outputted from the sheet detecting sensor S701, so that sheet reading start timing is determined by the back surface CIS 701.

The second reading portion 700B includes a third feeding roller pair 403 as a second rotatable member pair provided downstream of the first reading position with respect to the feeding direction Y2 and a fourth feeding roller pair 404 as a third rotatable member pair provided downstream of and adjacent to the first feeding roller pair with respect to the feeding direction Y2. Further, the second reading portion 700B includes a front surface CIS 702 as a second reading means provided downstream of the fourth feeding roller pair 404 with respect to the feeding direction Y2, a guiding roller 706 as a second guiding member, and a transparent guide 704 as a second light-transmissive plate. Further, the second reading portion 700B is provided between the fourth feeding roller pair 404 and the first surface CIS 702 and includes a sheet detecting sensor S702 for detecting a leading end of the sheet fed along the through passage 430.

Constituent elements of the second reading portion 700B correspond to the constituent elements of the first reading portion 700A, respectively. Specifically, the third feeding roller pair 403 corresponds to the first feeding roller pair 401, and the fourth feeding roller pair 404 corresponds to the third feeding roller pair 402, and the sheet detecting sensor S702 corresponds to the sheet detecting sensor S701. Further, the front surface CIS 702 corresponds to the back surface CIS 701, and the guiding roller 706 corresponds to the guiding roller 705, and the transparent guide 704 corresponds to the transparent guide 703. These corresponding constituent elements not only have similar functions but also are disposed vertically symmetrically, and contents common to the first reading portion 700A and the second reading portion 700B will be omitted from description of the second reading portion 700B.

The third feeding roller pair 403 forms a third nip N3 in which the sheet is capable of being nipped and is driven by a feeding motor M403 (FIG. 6) as a motor, so that the third feeding roller pair 403 feeds the sheet fed from the first reading portion 700A, in the feeding direction Y2. The fourth feeding roller pair 404 forms a fourth nip N4 in which the sheet is capable of being nipped and is driven by a feeding motor 404 (FIG. 2) as a motor, so that the fourth feeding roller pair 404 feeds the sheet fed from the third feeding roller pair 403, in the feeding direction Y2.

The front surface CIS 702 is disposed on the upper surface (front surface, second surface) side of the sheet fed along the through passage 430, and reads the contour of the sheet and the image information of the sheet fed along the through passage 430, from the upper surface of the sheet at the second reading position P2. The guiding roller 706 is disposed below the through passage 430 so that a part thereof projects toward the front surface CIS 702 side (upper side) than a nip line (common tangential line) in the fourth nip N4 of a pair of rollers constituting the fourth feeding roller pair 404.

The sheet fed along the through passage 430 by the fourth feeding roller pair 404 is not nipped at the second reading position between the transparent guide 704 and the guiding roller 706, so that the position of the sheet with respect to the thickness direction, i.e., a position of the front surface CIS 702 with respect to a direction of depth of focus is limited. The sheet fed along the through passage 430 is subjected to reading of the front surface thereof by the front surface CIS 702 while being fed in a state in which the position of the sheet with respect to the thickness direction is restricted.

On a side downstream of the second reading portion 700B with respect to the feeding direction Y2, a fifth feeding roller pair 405 for feeding the sheet while nipping the sheet is provided. The sheet read by the first reading portion 700A and the second reading portion 700B is fed toward the branch portion 431 by the fifth feeding roller pair 405. Incidentally, in this embodiment, the first feeding roller pair 401 to the fifth feeding roller pair 405 are disposed so that extended nip lines thereof coincide with each other, but are not limited thereto, and may also be cross or parallel to each other without coinciding with each other. Further, each of the guiding rollers 705 and 706 may only be required that at least a part thereof is disposed on a side close to the reading means for reading the sheet than the nip line of the feeding roller pair disposed immediately before the feeding roller pair. For example, in the case where the nip line of the first feeding roller pair 401 and the nip line of the fourth feeding roller pair 404 do not coincide with each other, the guiding roller 706 may only be required that at least a part thereof is disposed on the front surface CIS 702 side than the nip line of the fourth feeding roller pair 404. Further, in a sheet feeding passage from the second feeding roller pair 402 to the guiding roller 705 and in a sheet this embodiment passage from the fourth feeding roller pair 404 to the guiding roller 706, unshown rotatable members and unshown guiding members which are used for guiding the sheet may also be provided.

[Details of Front and Rear Registering Portion]

Next, details of the front and rear registering portion 700 will be described. In order to obtain good reading accuracy in the front and rear registering portion 700, it is desirable that the sheet passes through the first reading position P1 and the second reading position P2 at a certain feeding speed determined in advance. However, the guiding rollers 705 and 706 are disposed, so as to overlap with the nip line Np, and therefore, the sheet fed in the front and rear registering portion 700 is liable to contact the guiding rollers 705 and 706 at a leading end thereof. In the case where the sheet is read while being fed in the front and rear registering portion 700, when the leading end of the sheet contacts the guiding rollers 705 and 706, the leading end of the sheet instantaneously receives an external force with respect to a direction opposite to the feeding direction Y2. When the sheet receives such an external force, due to a slip of the sheet with the roller pair nipping the sheet and loss of synchronism of the motor for driving the roller pair, and the like, a change in feeding speed of the sheet and vibration of the sheet with respect to the feeding direction Y2 are liable to occur, so that it is difficult to obtain good reading accuracy of the sheet.

Figure 5:
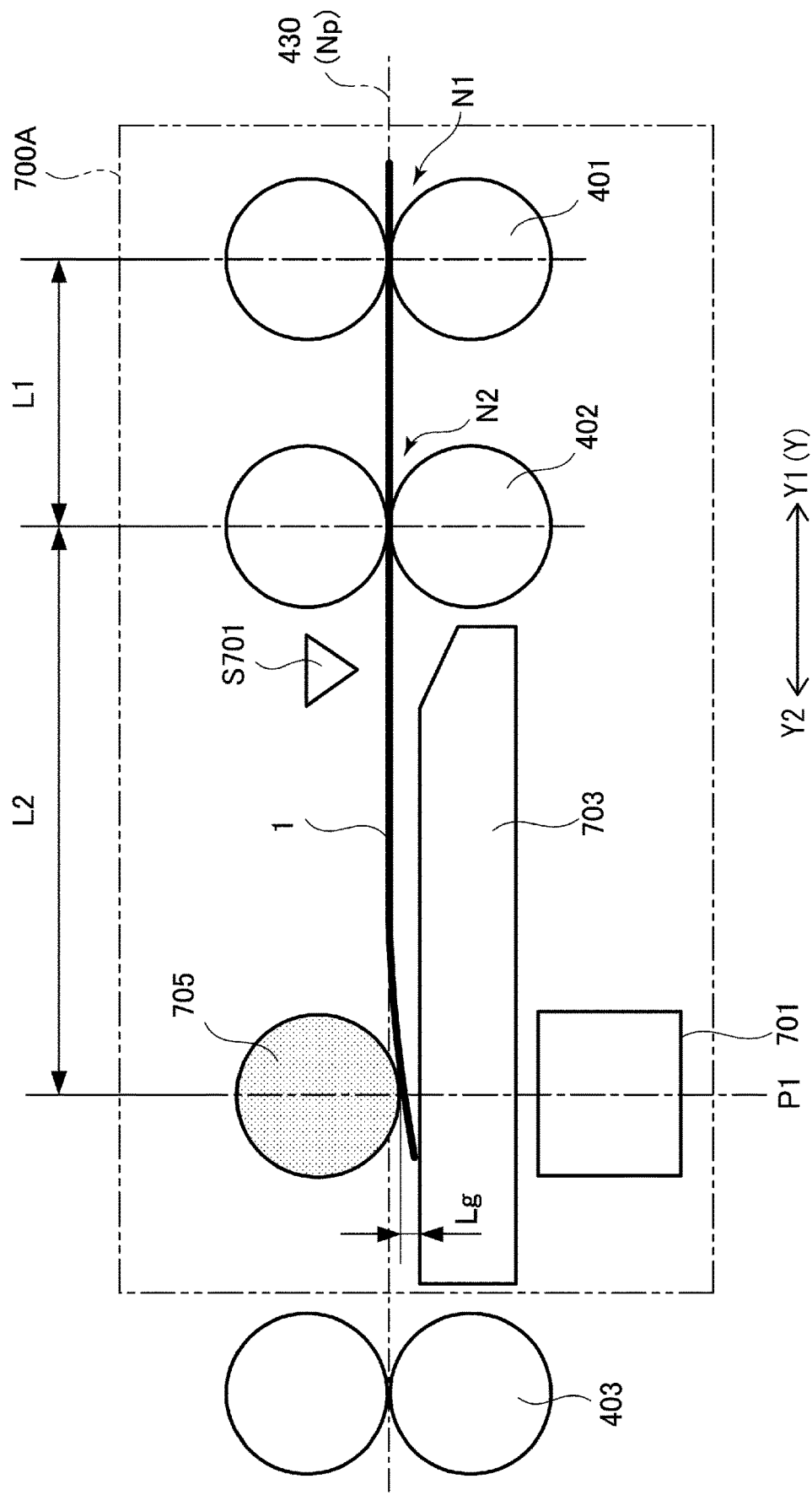
FIG. 5 is a side view showing a schematic structure of a lower reading portion.

As shown in FIG. 5, in the first reading portion 700A in this embodiment, the back surface CIS 701 is capable of reading the leading end of the sheet put in a state in which the sheet is nipped by the first feeding roller pair 401 and the second feeding roller pair 402. That is, the back surface CIS 701, the first feeding roller pair 401 and the second feeding roller pair 402 are disposed so that the leading end of the sheet reaches the first reading position P1 before a trailing end of the sheet passes through the first nip N1. In other words, the back surface CIS 701, the first feeding roller pair 401 and the second feeding roller pair 402 are disposed so that the sheet is nipped in the nip of each of these roller pairs when the leading end of the sheet enters between the guiding roller 705 and the transparent guide 703. By disposing these members in such a manner, for example, compared with the case where the leading end of the sheet put in a state the trailing end side of the sheet is held only by one roller pair is read, the trailing end side of the sheet can be firmly held (nipped) by a plurality of roller pairs. By this, it becomes possible to suppress the change in feeding speed of the surface and the vibration of the sheet with respect to the feeding direction Y2 when the leading end of the sheet contacts the guiding roller 705 and the like, so that the reading accuracy of the sheet can be improved.

For example, a distance (L1+L2) between the first nip N1 and the first reading position P1 is shorter than 210 mm which is a length of an A4-size sheet with respect to a short-side direction (widthwise direction). By this, when the leading end of the sheet with the A4 size which is a small size between sheet sizes high in needs in the market is read, the trailing end side of the sheet can be firmly held by the plurality of roller pairs.

Incidentally, the distance (L1+L2) between the first nip N1 and the first reading position P1 with respect to the feeding direction Y2 may also be constituted so as to be shorter than a length of a minimum-size sheet with respect to the sub-scan direction capable of being fed by the image forming apparatus 100 (adjusting unit 400). For example, the distance (L1+L2) between the first nip N1 and the first reading position P1 with respect to the feeding direction Y2 may also be constituted so as to be shorter than a distance between the second nip N2 and the third nip N3 with respect to the feeding direction Y2.

Further, the first reading portion 700A is not limited to one provided with a single back surface CIS and a single guiding roller. The first reading portion 700A may also be provided with a plurality of back surface CISs disposed at different positions from each other with respect to the main scan direction or the sub-scan direction and may also be provided with a plurality of guiding rollers disposed at different positions from each other with respect to the sub-scan direction. In such a case, a distance between the first nip N1 and a reading position of the back surface CIS disposed on a most upstream side with respect to the sub-scan direction (feeding direction) may desirably be shorter than 210 mm (or a length of the minimum-size sheet with respect to the sub-scan direction).

Further, in the first reading portion 700A in this embodiment, the distance L2 between the second nip N2 and the first reading position P1 with respect to the feeding direction Y2 is longer than the distance L1 between the first nip N1 and the second nip N2 with respect to the feeding direction Y2. By this, it becomes possible to alleviate stress exerted on the sheet from the guiding roller 705.

Also, in the second reading portion 700B, a positional relationship between the third nip N3, the fourth nip N4 and the second reading position P2 with respect to the feeding direction Y2 is similar to the positional relationship between the first nip N1, the second nip N2 and the first reading position P1 with respect to the feeding direction Y2. Specifically, the front surface CIS 702, the third feeding roller pair 403 and the fourth feeding roller pair 404 are disposed so that the sheet is nipped in the nip of each of these roller pairs when the leading end of the sheet enters between the guiding roller 706 and the transparent guide 704. By this, the second reading portion 700B suppresses the change in feeding speed of the sheet and the vibration of the sheet with respect to the feeding direction y2 when reads the sheet, so that the reading accuracy of the sheet can be improved.

Figure 6:
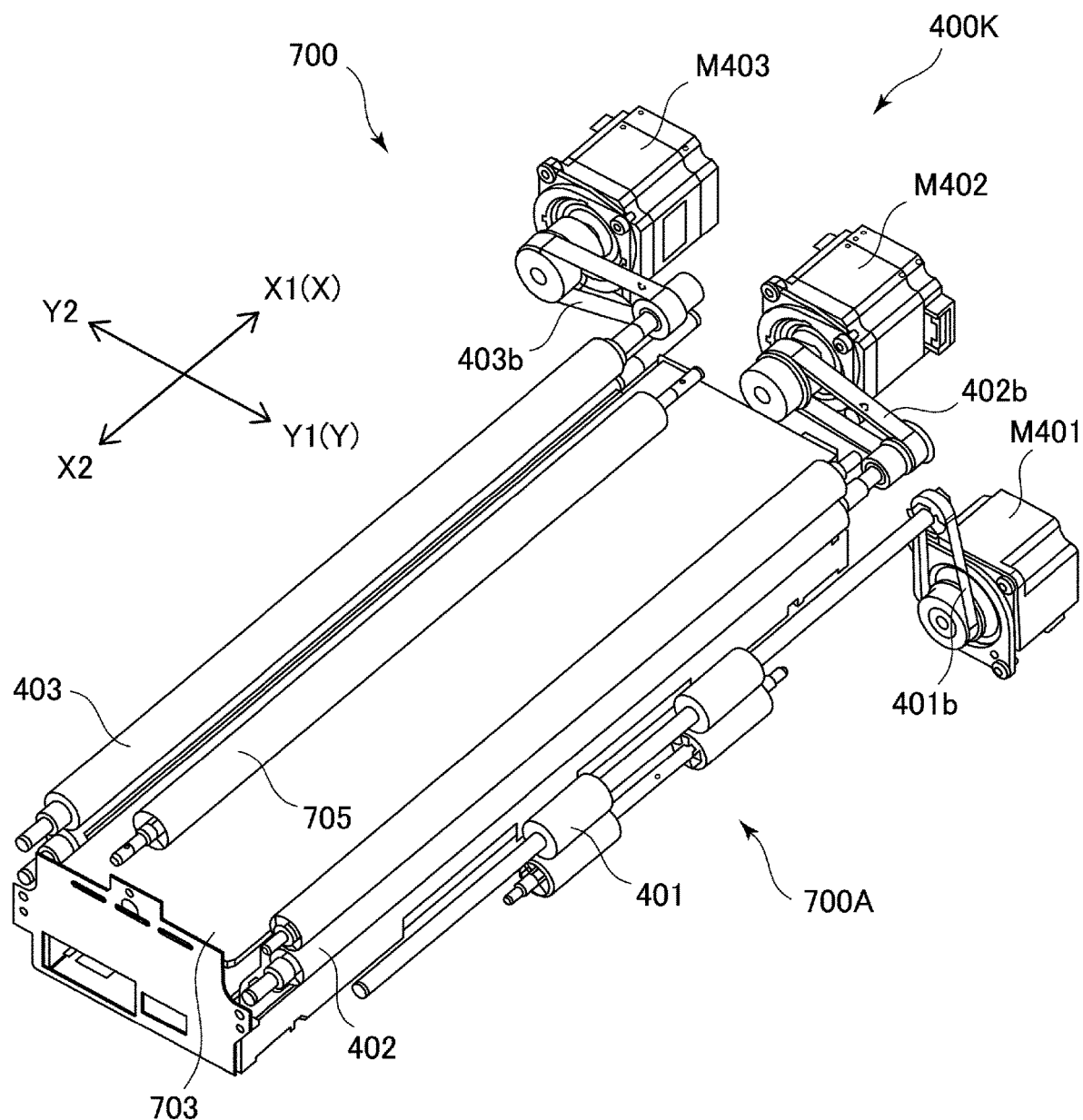
FIG. 6 is a perspective view showing the lower reading portion.

As shown in FIG. 6, the front and rear registering portion 700 includes a driving device 400K as a driving means which includes the above-described feeding motors M401 to M406 and toothed belts for transmitting driving forces of the feeding motors M401 to M406 to the respective rollers and which drives the respective rollers.

Specifically, the driving device 400K includes a toothed belt 401b for transmitting the driving force of the feeding motor M401 to the first feeding roller pair 401 by connecting the feeding motor M401 and the first feeding roller pair 401. Further, the driving device 400K includes a toothed belt 402b for transmitting the driving force of the feeding motor M402 to the second feeding roller pair 402 by connecting the second feeding motor M402 and the second feeding roller pair 402. Further, the driving device 400K includes a toothed belt 403b for transmitting the driving force of the feeding motor M403 to the third feeding roller pair 403 by connecting the third feeding motor M403 and the third feeding roller pair 403. Further, the driving device 400K includes a toothed belt (not shown) for transmitting the driving force of the fourth feeding motor M404 to the fourth feeding roller pair 404 by connecting the fourth feeding motor M404 and the fourth feeding roller pair 404.

By this, for example, compared with the case where the driving forces of the motors are transmitted by gears or the like, a degree of backlash between the motor and the rollers can be reduced, so that it becomes possible to suppress the change in feeding speed of the sheet and the vibration of the sheet with respect to the feeding direction Y2.

Incidentally, the driving device 400K in this embodiment is constituted so as to transmit the driving force of each of the feeding motors M401 to M404 to the rollers by the toothed belt, but is not limited thereto. The driving device 400K may only be required to include at least one motor and one toothed belt for transmitting the driving force of the motor to at least one roller pair capable of holding the trailing end side of the sheet when the leading end of the sheet reaches the reading position. For example, the driving device 400K may also drive the plurality of roller pairs by a single motor and may also transmit the driving force of the single motor to the pluralities of roller pairs. Further, for example, the driving device 400K may also be constituted so that the driving force of the motor is transmitted to either one of the first feeding roller pair 401 and the second feeding roller pair 402 by gears or the like.

[Reading of Sheet and Feed-Back of Reading Result]

Next, with reference to FIGS. 1, 2 and 7 to 11, reading of the sheet by the front and back registering portion 700 and feed-back of a reading result will be described. The sheet library 900 (FIG. 2) held in the memory 302 by the printer controller 103 includes data in which a list of sheets usable as the recording material is stored by the image forming apparatus 100 in association with attribute information such as lengths in the sub-scan direction and the main scan direction and a basis weight. This sheet library 900 includes geometric adjusting values used when an image forming process is executed for each of the sheets. The geometric adjusting values are parameters for correcting a position of the image relative to the contour of the sheet, a magnification of the image, and the like.

Figure 7A:
FIG. 7A is a schematic view showing a display screen of a sheet library.
Figure 7B:
FIG. 7B is a schematic view showing a selection screen of a correcting method of a geometric adjusting value.

As shown in FIG. 7A, the contents of the sheet library 900 can be checked by displaying a library display screen 1001 on the operating portion 180 (FIG. 1). When a user operates a "print position adjustment" button 1002 on the library display screen 1001, a correcting method selection screen 1003 of the geometric adjusting value shown in FIG. 7B is displayed. In the case where the user selects a choice 1004 of "MANUALLY ADJUST", the user is capable of directly designating the geometric adjusting value by inputting numeric values with use of the numeric keys 181 (FIG. 1) provided on the operating portion 180.

On the other hand, in the case where the user selects a choice 1005 of "READ TEST PAGE AND ADJUST", the image forming system 100S (FIG. 1) executes a front and back registration process in which the front and back registration is performed on the basis of the reading result of the sheet. In the front and back registration process, the image forming apparatus 100 forms test patterns 820 (FIGS. 8A and 8B) for performing the front and back registration of the sheet. Further, in the front and back registration process, the front and back registering portion 700 (FIG. 1) of the adjusting unit 400 reads the sheet fed from the image forming apparatus 100 and feeds back a reading result to the image forming apparatus 100. The image forming apparatus 100 performs adjustment (correction) of the geometric adjusting value on the basis of the feed-back from the adjusting unit 400.

Specifically, when the front and back registration process is started, the image forming apparatus 100 in this embodiment feeds the sheet 1 from the sheet accommodating portion 113 accommodating sheets designated as an object to be subjected to the front and back registration process. Thereafter, the image forming apparatus 100 forms, on double surfaces (sides) of the sheet 1, the test patterns 820 (FIGS. 8A and 8B) including rectangular patch images disposed in the neighborhood of four corners of each of sheet surfaces by the image forming engine 102. After the formation of the test patterns 820, the image forming apparatus 100 discharges the sheet 1 toward the adjusting unit 400. The test patterns 820 are not limited to those constituted by a plurality of the rectangular patch images, but may also be those constituted by a plurality of square patch images. Further, each of the test patterns 820 may also be constituted by a so-called register mark (crossmark) which is a bleeding position mark or a folding position mark or by another shape image or by a combination of these marks or images. Further, a color or a density of the test pattern is not limited to uniform color or density, but the test pattern may also include patch images with a plurality of colors or a plurality of densities.

When the adjusting unit 400 receives the sheet 1 from the image forming apparatus 100, the adjusting unit 400 reads, as a line image, the front surface and the back surface of the sheet 1 by the front surface CIS 701 and the back surface CIS 702 (FIG. 4) while feeding the received sheet 1 by the respective feeding roller pairs. Then, an image processing portion 460 (FIG. 2) of the adjusting unit 400 connects the red line images in the sub-scan direction (feeding direction of the sheet 1), so that image data of the front surface and the back surface of the sheet 1 containing the test patterns 820 are combined. Thus, the adjusting unit 400 reads image information of the test patterns 820 when the fed sheet 1 is read by the front surface CIS 701 and the back surface CIS 702.

Figure 8B:
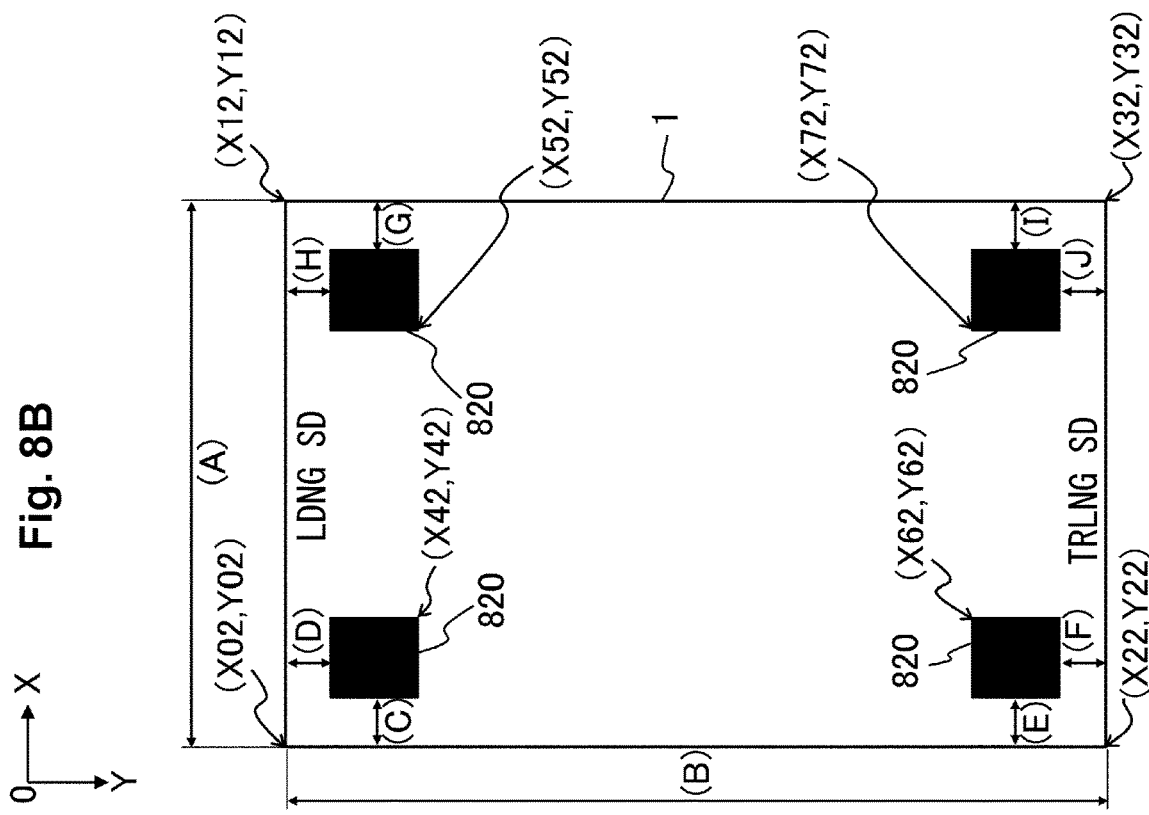
FIG. 8B is a schematic view showing a test pattern for front and back registration formed on a back surface of the sheet.
Figure 8A:
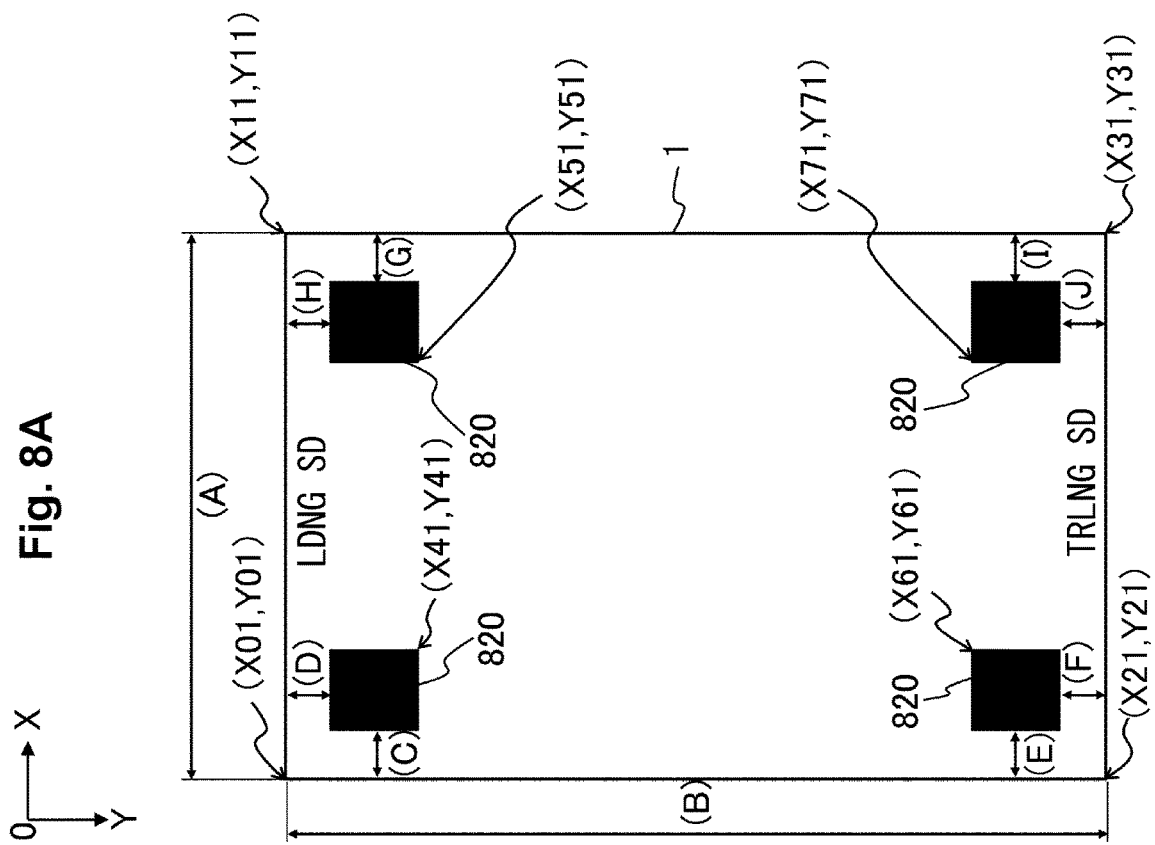
FIG. 8A is a schematic view showing a test pattern for front and back registration formed on a front surface of a sheet.

The image processing portion 460 of the adjusting unit 400 specifies a shape (contour) of the sheet 1, shapes (contours) of patch images formed on the sheet 1, and a positional relationship of these contours. Specifically, from the combined image data, with respect to the front surface and the back surface of the sheet 1, corner coordinates and coordinates of the patch images of the test patterns 820 are specified. As shown in FIGS. 8A and 8B, the corner coordinates of the sheet 1 represents four corner positions {(X01, Y01) to (X31, Y31) and (X02, Y02) to (X32, Y32)} of the sheet 1 when an X-axis is the main scan direction and a Y-axis is the sub-scan direction. Further, the coordinates of the test patterns 820 represents specific site positions {(X41, Y41) to (X71, Y71) and (X42, Y42) to (X72, Y72)} of the patch images in the same coordinate system as in the corner coordinate system.

From the corner coordinates, it is possible to geometrically calculate a length (short side length) (A) of the sheet 1 with respect to the main scan direction, a length (long side length) (B) of the sheet 1 with respect to the sub-scan direction, and perpendicularity of each of the corners, and the like, and therefore, it can be said that the corner coordinates include information on the shape (contour) of the sheet 1. Further, from the corner coordinates and the coordinates of the test patterns 820, it is possible to geometrically calculate positional deviation and distortion of the image relative to the contour of the sheet 1, and therefore, it can be said that the corner coordinates and the coordinates of the test patterns 820 include information on positions and distortion of the images relative to the sheet 1.

The image processing portion 460 further determines (calculates) geometric adjusting values for this sheet 1 by using the corner coordinates of the sheet 1 and the coordinates of the test patterns 820. For example, the image processing portion 460 determines a lead position, a side position, main scan magnification and sub-scan magnification as the geometric adjusting values. The lead position is a parameter for defining an image position relative to the sheet 1 with respect to the sub-scan direction. The side position is a parameter for defining the image position relative to the sheet 1 with respect to the main scan direction. The main scanning magnification is a parameter for defining magnification for magnifying or minifying the image data with respect to the main scan direction. Further, the sub-scan magnification is a parameter for defining magnification for magnifying or minifying the image data with respect to the sub-scan direction. The geometric adjusting values are determined so that distances ((c) to (j) in FIGS. 8A and 8B) from the test patterns 820 to ends (edges) of the sheet 1 are equal to preset values, respectively, in the case where correction of an image shape is made.

Incidentally, the four parameters consisting of the lead position, the sheet position, the main scan magnification and the sub-scan magnification are cited as the geometric adjusting values, but the image processing portion 460 may also calculate other parameters. As other parameters, for example, a parameter for correcting perpendicularity of the image, a parameter for making trapezoidal correction of the image, a parameter for defining an angle of rotation of the image relative to the sheet, and the like parameter would be considered.

The geometric adjusting values determined by the image processing portion 460 are sent to the printer controller 103 of the image forming apparatus 100 and are registered in the sheet library 900. In the case where the image forming apparatus 100 executes an image forming job, an image shape correcting portion 320 acquires pieces of sheet information 910, 911, 912, ... (FIG. 7A) and geometric adjusting values of the sheet designated as the recording material by making reference to the sheet library 900. Then, the image shape correcting portion 320 corrects image data on the basis of the acquired geometric adjusting values for the sheet. The image data of the front surface and the back surface of the sheet are corrected, so that front and back registration of the sheet is carried out.

Incidentally, in this embodiment, the case where the test patterns 820 for front and back registration are formed on the basis of an explicitly instruction from the user and then the adjusting unit 400 acquires the geometric adjusting values was described, but the present invention is not limited thereto. For example, in the case where the image forming job is inputted, as a preparatory operation before the job is executed, the test patterns 820 are formed on the same sheet as the sheet designated in the job and then the geometric adjusting values may also be acquired. Further, during execution of an image forming job requiring a mass of products, a job for forming the test patterns 820 is automatically interposed every output of a certain number of sheets as the products and then correction (calibration) may also be made. The purpose of reading the sheet by the adjusting unit 400 is not limited to that the geometric adjusting values are acquired and then the positional deviation and distortion of the image relative to the sheet are corrected. For example, in order to monitor that the positional deviation and distortion of the image relative to the sheet fall within predetermined values, the adjusting unit 400 may also read the sheets on which product images are formed and which are continuously fed (reading of image information from the sheet).

[Control Method]

Figure 9:
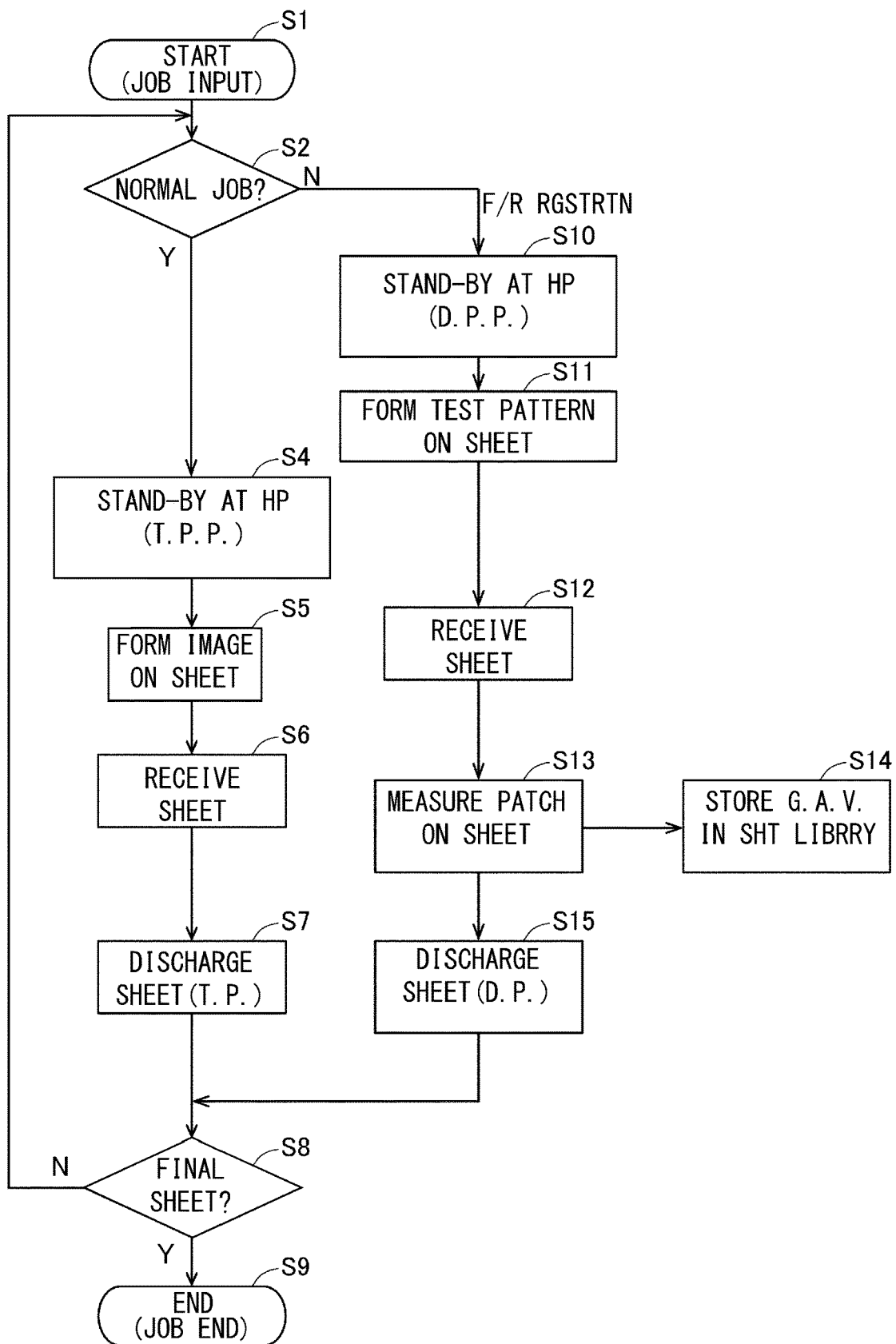
FIG. 9 is a flowchart showing a control example of the image forming system.

In the above-constituted image forming system 100S, a control method when feeding and reading of the sheet are carried out by the adjusting unit 400 will be described along a flowchart of FIG. 9 while making reference to the block diagram of FIG. 2.

In the following description, of the image forming job, a job which requires output of the product and in which the adjusting unit does not perform the reading of the sheet is referred to as a "normal job". Further, of the image forming job, a job in which the adjusting unit 400 performs the reading of the sheet by the back surface CIS 701 and the front surface CIS 702 (FIG. 4) is referred to as a "front and back registration nip". Incidentally, the ordinary job is inputted to the printer controller 103 in the case where the ordinary job is inputted from an external computer via the external interface (I/F) 303 (FIG. 2) and the case where the user provides an instruction to start a copying operation through the operating portion 180 and in the like case. Further, the front and back registration job can be inputted in the case where the job is executed by the explicit instruction from the user and in the case where the image forming system 100S voluntarily executes the job, as described above.

When the image forming job is started (S1), the printer controller 103 discriminates whether the job is the normal job or the front and back registration job (S2). In the case of the normal job (S2: Y), the image forming apparatus 100 and the adjusting unit 400 cause members (for example, the flapper and the like) relating to the sheet feeding to stand by default positions (home positions). For example, the adjusting unit 400 positions the switching flapper 422 at a position for guiding the sheet to the first discharging opening 442 along the through passage 430 (FIG. 10A) (S4). That is, as shown in FIG. 10A, the switching flapper 422 is kept at an upward position.

The image forming apparatus 100 forms the image on the sheet 1 in accordance with the image data required to be outputted by the image forming job (S5), and the adjusting unit 400 receives the sheet 1 on which the image is formed (S6). Then, as shown in FIGS. 10A and 10B, the adjusting unit 400 delivers the sheet 1 successively by the respective feeding roller pairs and causes the sheet 1 to pass through the through passage 430. Then, the adjusting unit 400 discharges the sheet 1 by the outlet feeding roller pair 406 to the finisher 600 (FIG. 1) through the first discharging opening 442 (S7). When the finisher 600 receives the sheet 1, the finisher 600 subjects the sheet 1 to processing (treatment) by the processing portion 601, so that the processed sheet 1 is stacked as a product on a stacking tray 602.

In the case of the front and back registration job (S2: N), the adjusting unit 400 positions the switching flapper 422 at a position for guiding the sheet 1 to the discharging passage 432 (FIG. 11A) (S10). That is, as shown in FIG. 11A, the switching flapper 422 is kept at a downward position.

The image forming apparatus 100 forms the test patterns 820 for the front and back registration (FIGS. 8A and 8B) on the sheet 1 (S11), and the adjusting unit 400 receives the sheet 1 on which the test patterns 820 are formed (S12). The adjusting unit 400 causes the CISs 701 and 702 to read the sheet fed along the through passage 430 when the sheet 1 is passed through the reading positions P1 and P2 (FIG. 4) of the back surface CIS 701 and the front surface CIS 702 (S13, FIGS. 11A and 11B). Incidentally, before the test patterns 820 on the sheet 1 pass through the first reading position P1 of the back surface CIS 701, the controller 451 of the adjusting unit 400 may decelerate a feeding speed of the sheet 1 to a feeding speed suitable for reading of the sheet 1 by the CISs 701 and 702.

The image data read by the back surface CIS 701 and the front surface CIS 702 are processed by the image processing portion 460, so that the geometric adjusting values are calculated. The calculated geometric adjusting values are sent to the image forming apparatus 100 via a communicating portion 450 and are stored in the sheet library 900 (S14).

When the sheet 1 passed through the reading positions P1 and P2 reaches the branching portion 431 from the through passage 430 toward the discharging passage 432, the adjusting unit 400 feeds the sheet 1, guided by the switching flapper 422, toward the second discharging opening 443 along the discharging passage 432. The adjusting unit 400 discharges the sheet 1, fed along the discharging passage 432, to the discharge tray 423 through the second discharging opening 443 (S15).

In order to perform the front and rear registration on the basis of an averaged geometric adjusting value, the above-described processes are repetitively executed for each of the sheets in the number of sheets designated in the job, and after the process for a final sheet is ended (S8: Y), the job is ended (S9). Incidentally, in a control example shown in FIG. 9, a kind of the job is discriminated every sheet during processing of the same job, but a constitution in which the kind of the job is discriminated at the time of the start of the job and in which the same process as the process for the last sheet is applied without discriminating the kind of the job during the processing of the job may also be employed. Further, in the control example shown in FIG. 9, the sheet is discharged to the discharge tray 423 after the sheet is read in the job for performing the front and back registration, but the present invention is not limited thereto. The image forming system 100S may also be capable of executing control such that the sheet 1 is discharged to the finisher 600 after the sheet is read in the job for performing the front and back registration. For example, a constitution in which the image forming apparatus 100 forms, on a sheet, an image as a product and test patterns disposed at a marginal portion of the sheet and discharges the sheet to the finisher 600 after the adjusting unit 400 reads the sheet and then the finisher 600 cuts the marginal portion including the test patterns from the sheet may also be employed.

As described above, according to this embodiment, the adjusting device 400 is capable of reading the leading end of the sheet in a state in which the trailing end side of the sheet is nipped by the plurality of roller pairs. By this, the change in feeding speed and the vibration of the sheet with respect to the feeding direction Y2 when the sheet is read are suppressed, so that the reading accuracy of the sheet can be improved.

Incidentally, in this embodiment, as the image reading apparatus, the adjusting unit 400 for reading the test patterns 820 for performing the front and back registration and reading the shape of the sheet was described, but the present invention is not limited thereto. The image reading apparatus may only be required to be provided with the reading means for reading the image information of the sheet while nipping and feeding the sheet, and does not have to read the contour (shape) of the sheet and does not have to perform the front and back registration, and does not have to be capable of reading double surfaces (sides) of the sheet. For example, the image reading apparatus may also be provided with a color sensor as a reading means for reading color information (density information) of a test pattern (image) formed on the sheet in order to perform color (tint) adjustment, density adjustment and the like adjustment. Further, for example, the image reading apparatus may also be an image reading apparatus provided for the purpose of converting contents into electronic data after reading a general image, an original or the like. Further, for example, the image reading apparatus may also include one of the first reading portion 700A and the second reading portion 700B and thus may also be capable of reading only the image formed on one surface (first surface) of the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095100 filed on May 29, 2020, which is hereby incorporated by reference herein in its entirety.

What is claimed is:

1. An image forming system comprising:
an image forming apparatus including an image forming unit configured to form an image on a sheet;
an image reading apparatus configured to read the image on the sheet discharged from the image forming apparatus; and
a controller configured to control an image forming condition of the image forming unit based on a reading result by the image reading apparatus, wherein the image reading apparatus comprises:
(1) a first conveying roller pair configured to convey the sheet discharged from the image forming apparatus in a conveyance direction;
(2) a second conveying roller pair provided downstream of and adjacent to the first conveying roller pair with respect to the conveyance direction and configured to convey the sheet in the conveyance direction; and (3) an image reading sensor configured to read the image on the sheet at a reading position provided downstream of the first conveying roller pair and the second conveying roller pair with respect to the conveyance direction, wherein a distance between a nip of the first conveying roller pair and the reading position with respect to the conveyance direction is shorter than 210 mm, and wherein a distance between a nip of the second conveying roller pair and the reading position with respect to the conveyance direction is longer than a distance between the nip of the first conveying roller pair and the nip of the second conveying roller pair with respect to the conveyance direction.

2. An image forming system according to claim 1, wherein the image reading apparatus further comprises a guiding member provided opposed to the image reading sensor at the reading position and configured to guide the sheet conveyed by the first conveying roller pair and the second conveying roller pair.

3. An image forming system according to claim 2, wherein a part of the guiding member is disposed on a side closer to the image reading sensor than a common tangential line of the first conveying roller pair in the nip of the first conveying roller pair.

4. An image forming system according to claim 2, wherein a part of the guiding member is disposed on a side closer to the image reading sensor than a straight line passing through the nip of the first conveying roller pair and the nip of the second conveying roller pair.

5. An image forming system according to claim 2, wherein the guiding member is a black rotatable member or a gray rotatable member.

6. An image forming system according to claim 1, wherein the image forming apparatus adjusts a position of the image relative to the sheet when the image is formed on the sheet, based on information depending on the image read by the image reading sensor.

* * * * *